United States Patent [19]
Goodwin

[11] 3,760,686
[45] Sept. 25, 1973

[54] BACKLASH ELIMINATION ARRANGEMENT

[75] Inventor: David Goodwin, Colchester, Essex, England

[73] Assignee: Machine Tools Limited, London, England

[22] Filed: Feb. 22, 1972

[21] Appl. No.: 228,201

[30] Foreign Application Priority Data
Feb. 25, 1971  Great Britain .................. 5,434/71

[52] U.S. Cl. ..................................... 90/22, 74/441
[51] Int. Cl. ............................................ F16h 55/18
[58] Field of Search ..................... 90/22; 74/441; 151/7

[56] References Cited
UNITED STATES PATENTS
| | | | |
|---|---|---|---|
| 1,256,471 | 2/1918 | Genero | 74/441 |
| 2,173,660 | 9/1939 | Perkins | 74/441 X |
| 3,040,796 | 6/1962 | Gouvernewr | 151/7 |
| 2,498,870 | 2/1950 | Armitage et al. | 74/441 |
| 2,734,394 | 2/1956 | Chauvel | 74/441 |

FOREIGN PATENTS OR APPLICATIONS
999,815  2/1952  France ................................. 90/22

*Primary Examiner*—Andrew R. Juhasz
*Assistant Examiner*—Z. R. Bilinsky
*Attorney*—Leo A. Rosetta et al.

[57] ABSTRACT

Particularly for use in a machine tool, for example, a lathe or milling machine, an assembly for the elimination of backlash between a screw-threaded shaft and a member which co-operates with the shaft, including a first nut on the member and threaded on the shaft, a second nut threaded on the shaft and a worm carried by the member in engagement with worm teeth on the second nut, so that rotation of the work will move the second nut axially of the shaft to eliminate backlash between the first nut and hence the member and the shaft.

1 Claim, 4 Drawing Figures

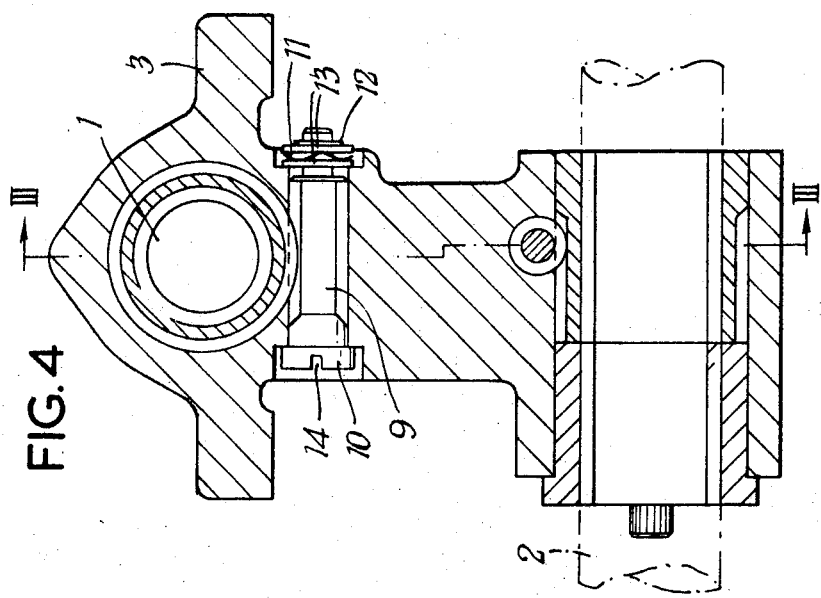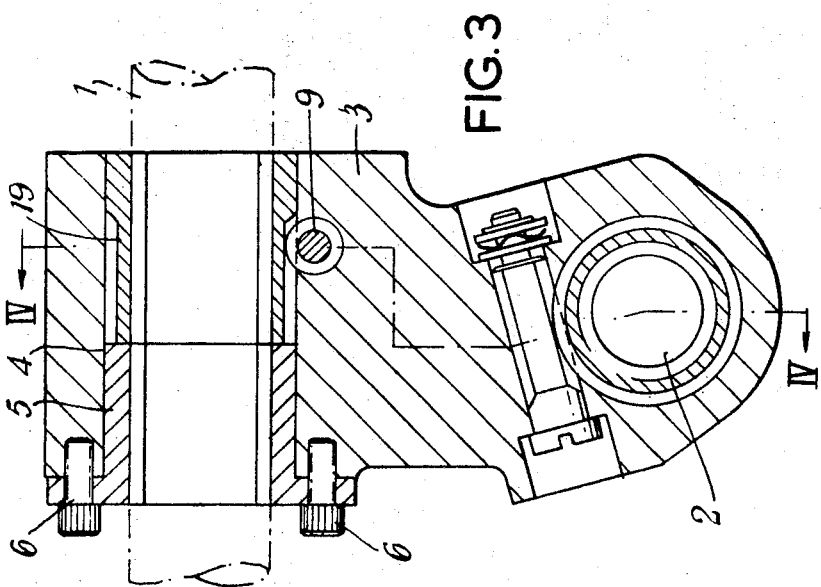

BACKLASH ELIMINATION ARRANGEMENT

This invention relates to a backlash elimination arrangement.

In machine tools, for example, milling machines and lathes, it is the practice to employ leadscrews for feeding parts of the machine to a desired position prior to a cutting operation being performed or for feeding parts of a machine at a given rate during cutting. Such movement is achieved by the parts having internal screw-threads which engage the screw-threads of the leadscrews, rotation of the leadscrews effecting linear movement of the parts.

The accurate positioning of the parts is necessary if accurate machining operations are to be performed and it is therefore most desirable for any backlash between the leadscrews and parts to be eliminated. Accordingly, it is the main object of this invention to provide a backlash elimination arrangement which is simple in construction.

According to the present invention there is provided an assembly for the elimination of backlash between a screw-threaded shaft and a member co-operating with the shaft whereby rotation of the shaft effects relative movement between the shaft and member axially of the shaft, comprising a first internally screw-threaded part on the member in screw-threaded engagement with the shaft, a second internally screw-threaded part in screw-threaded engagement with the shaft and a worm rotatably mounted in the member and in engagement with worm teeth on the second part, the second part being movable axially of the shaft in relation to the first part by rotation of the worm to eliminate backlash between the first part and the shaft.

Conveniently, the first part is formed separately from and fixed to the member and the first and second parts are mounted within a bore in the member.

Conveniently, the said second part is provided with external screw-threads in engagement with internal screw-threads of a flange fixed to the member, the screw-threads of the second part and flange having a different pitch than the screw-threads of the shaft.

Two embodiments of the invention will now be described, by way of example only, and with reference to the accompanying drawings, in which FIG. 1 is a cross-sectional view on the line I—I of FIG. 2 of a backlash elimination assembly according to the invention;

FIG. 3 is a cross-sectional view on the line III—III of FIG. 4 of a further backlash elimination assembly according to the invention; and FIG. 4 is a cross-sectional view on the line IV—IV of FIG. 3.

Figure 2:
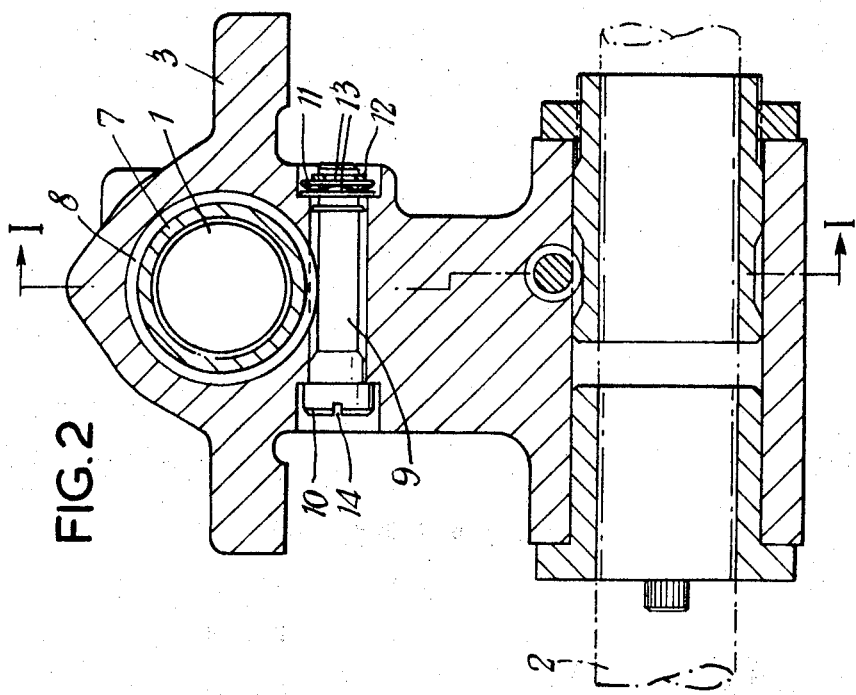
FIG. 2 is a cross-sectional view on the line II—II of FIG. 1.
Figure 1:
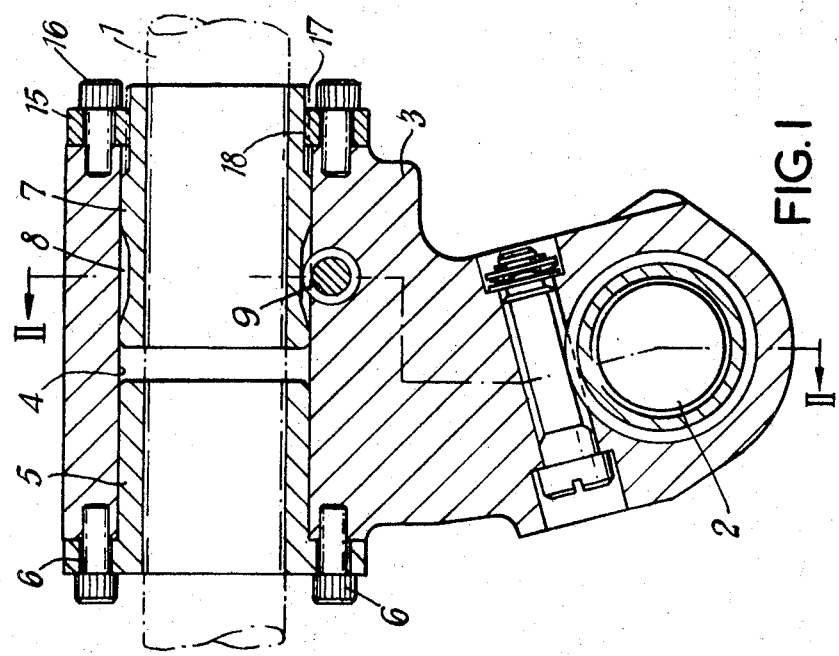

The embodiment of FIGS. 1 and 2 of the drawing is for incorporation in a milling machine having leadscrews 1 and 2 arranged mutually at right angles, a similar backlash elimination arrangement being applied to each leadscrew in one assembly. A one-piece casting forms a member 3 which is to be moved along the axis of each leadscrew depending on the rotation of those shafts. Leadscrew 1 passes through a bore 4 in the member 3, the leadscrew 1 engaging an internally screw-threaded first part or nut 5 fixed by bolts 6 to the member 3. The leadscrew 1 also engages an internally screw-threaded second part or nut 7 which has worm teeth 8 on its outer surface which co-operate with worm 9 having a low helix angle rotatably mounted in member 3. The worm 9 is retained in postion by head 10 at one end and undulating spring washer 11 and spring retaining clip 12 at the other end. The washer 11 is held between two plain washers 13. The head 10 is provided with slot 14 for adjustment of the worm by a screw driver.

Fixed by bolts 16 to member 3 is a flange 15 which has internal screw-threads for engagement with external screw-threads 17 on the nut 7. The screw-threads of flange 15 and nut 7 have a different pitch from the screw-threads of lead screw 1. Between the screw-threads of flange 15 and nut 7 is a friction pad 18.

To eliminate the backlash between leadscrew 1 and nut 5, the worm 9 is rotated by a screw driver in slot 14 which will rotate nut 7. The internal screw-threads of nut 7 and the screw-threads of the leadscrew 1 having a different pitch from the screw-threads of flange 15 and the external screw-threads of nut 7, will interact to eliminate the backlash between leadscrew 1 and nut 5. Nut 7 may be moved in either axial sense to eliminate the backlash.

Rotation of leadscrew 1 during use of the arrangement in a machine tool will not cause rotation of worm 9 because of the low helix angle. However, vibration of the machine tool may tend to make the worm rotate and hence induce backlash but this is minimised by the provision of undulating washer 11 and friction pad 18, the latter preventing inadvertent movement of nut 7. If any backlash arises during use, it is a simple matter for the machine operator to take up this backlash by rotation of worm 9.

The backlash elimination arrangement for leadscrew 2 is similar to that for leadscrew 1 described above and will not therefore be described in detail.

Referring now to FIGS. 3 and 4 in which a further embodiment is shown, like parts in this embodiment and the embodiment of FIGS. 1 and 2 have been given like reference characters.

In this embodiment the nut 7 is replaced by a nut 19 and the flange 15 is dispensed with. The nut 19 is rotatable by worm 9 and to effect backlash elimination worm 9 is rotated to rotate and therefore move nut 19 axially of leadscrew 1 until nut 19 becomes in firm contact with nut 5. This will take up any backlash between leadscrew 1 and nut 5.

The backlash elimination arrangement for leadscrew 2 is similar for that described above for leadscrew 1 and will not be further described.

The backlash elimination arrangement of the present invention is particularly applicable to machine tools such as milling machines and lathes but is also applicable to other devices where there is a need for accurate positioning of a member.

I claim:

1. In a machine tool having a screw-threaded shaft and a member co-operating with said shaft whereby rotation of said shaft effects relative movement of said shaft and member axially of said shaft, the improvement comprising:

a first internally screw-threaded part fixed within said member and in screw-threaded engagement with said shaft;

a second internally screw-threaded part mounted within said member for rotation and axial movement relative thereto and in screw-threaded engagement with said shaft;

said second screw-threaded part having external threads thereon;

an internally screw-threaded flange fixed to said member and in screw-threaded engagement with the external screw-threads on said second part, the internal screw-threads of said flange and the external threads of said second part having a different pitch from the mating screw-threads of said first part and said shaft;

a friction pad interposed between the screw-threads of said second part and said flange to prevent inadvertent movement of said second part;

said second screw-threaded part having worm teeth around its periphery;

a worm screw having a low helix angel rotatably mounted in said member and in worm screw engagement with the worm teeth on said second part; and spring means associated with said worm to hold said worm against inadvertent rotation, whereby rotation of said worm will cause movement of said second part axially relative to said first part and thereby eliminate backlash between said first part and said shaft.

* * * * *

UNITED STATES PATENT OFFICE
CERTIFICATE OF CORRECTION

Patent No. 3,760,686          Dated September 25, 1973

Inventor(s) DAVID GOODWIN

It is certified that error appears in the above-identified patent and that said Letters Patent are hereby corrected as shown below:

Please correct the name of the Assignee to read:

600 Machine Tools Limited

Signed and sealed this 12th day of February 1974.

(SEAL)
Attest:

EDWARD M. FLETCHER, JR.          C. MARSHALL DANN
Attesting Officer                Commissioner of Patents